US 6,681,600 B1

(12) United States Patent
Mitchell et al.

(10) Patent No.: US 6,681,600 B1
(45) Date of Patent: Jan. 27, 2004

(54) SYSTEM FOR REMOVING A UNIFORM LENGTH OF COATING FROM A FIBER OPTIC CABLE

(75) Inventors: David C. Mitchell, Laurel, MD (US); Gary Kles, Sykesville, MD (US); Thomas R. Boyer, Gambrills, MD (US)

(73) Assignee: Ciena Corporation, Linthicum, MD (US)

( * ) Notice: Subject to any disclaimer, the term of this patent is extended or adjusted under 35 U.S.C. 154(b) by 173 days.

(21) Appl. No.: 09/845,001

(22) Filed: Apr. 27, 2001

(51) Int. Cl.⁷ ............................................... C03B 37/25
(52) U.S. Cl. ..................... 65/473; 65/529; 156/345.11; 156/345.23
(58) Field of Search .................. 65/473, 529; 118/500, 118/728; 269/54, 54.1; 156/345.11, 345.23; 216/7

(56) References Cited

U.S. PATENT DOCUMENTS

| | | | | |
|---|---|---|---|---|
| 4,555,257 A | * | 11/1985 | Howard et al. | 65/529 |
| 5,279,136 A | * | 1/1994 | Perry | 70/18 |
| 5,305,508 A | * | 4/1994 | Koch et al. | 29/33 M |
| 6,419,743 B1 | * | 7/2002 | Stowe | 118/67 |

FOREIGN PATENT DOCUMENTS

GB     2186319    *   8/1987

* cited by examiner

*Primary Examiner*—Gregory Mills
*Assistant Examiner*—Sylvia R. MacArthur
(74) *Attorney, Agent, or Firm*—Michael Cammarata; James Olsen

(57) ABSTRACT

A system and method for removing a predetermined length of coating from a fiber optic cable. The system includes a chemical bath, and a system for forming a loop in a fiber optic cable. The loop forming system includes a vertical column, and a slide arm having a guide collar portion slidably provided on the vertical column, and a distal portion extending away from and integral with the guide collar portion. The loop forming system further includes a mount shaft extending from and connected to the distal portion of the slide arm, the mount shaft having clamps and a tensioning spring for retaining portions of the fiber optic cable. A push rod movably extends through the mount shaft, and connects to a fiber optic cable loop former. The fiber optic cable loop former engages a surface of the mount shaft and is pushed away therefrom by the push rod during formation of the loop in the fiber optic cable. The slide arm is lowered on the vertical column a predetermined height so that the loop formed in the fiber optic cable is provided into the chemical bath to remove a predetermined length of coating from the fiber optic cable.

23 Claims, 3 Drawing Sheets

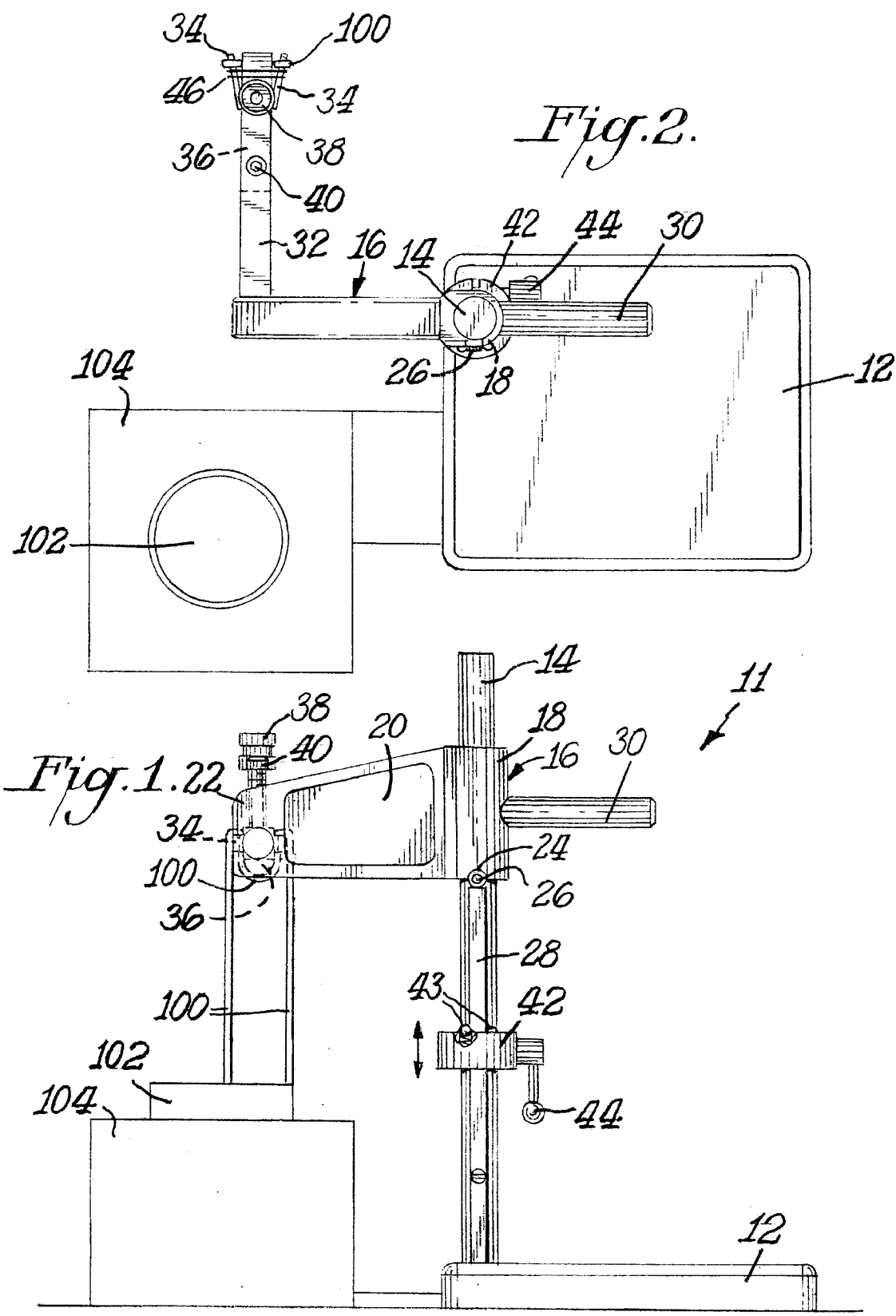

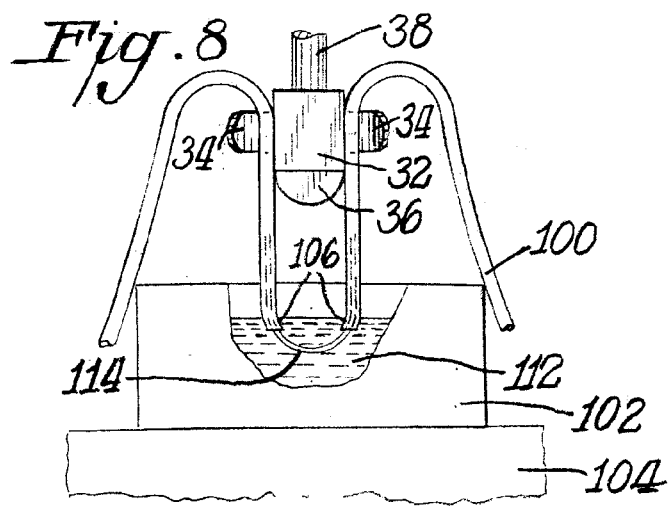
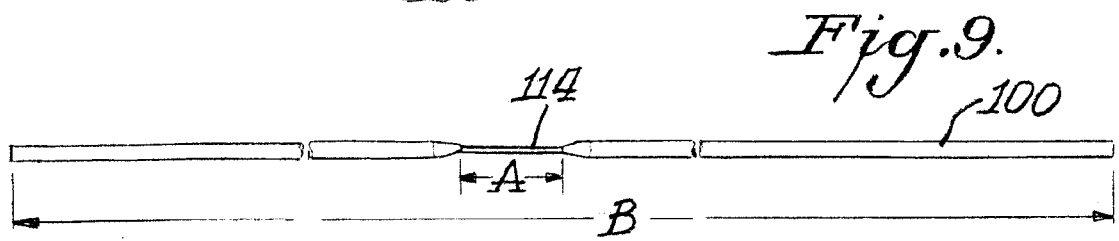
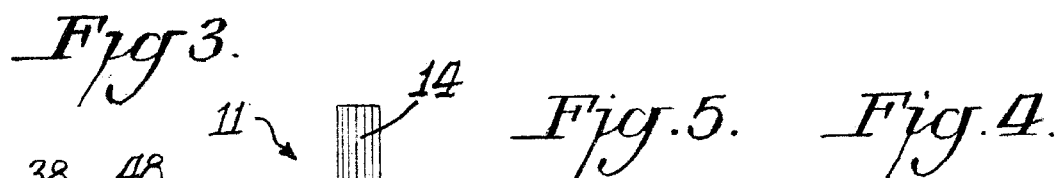
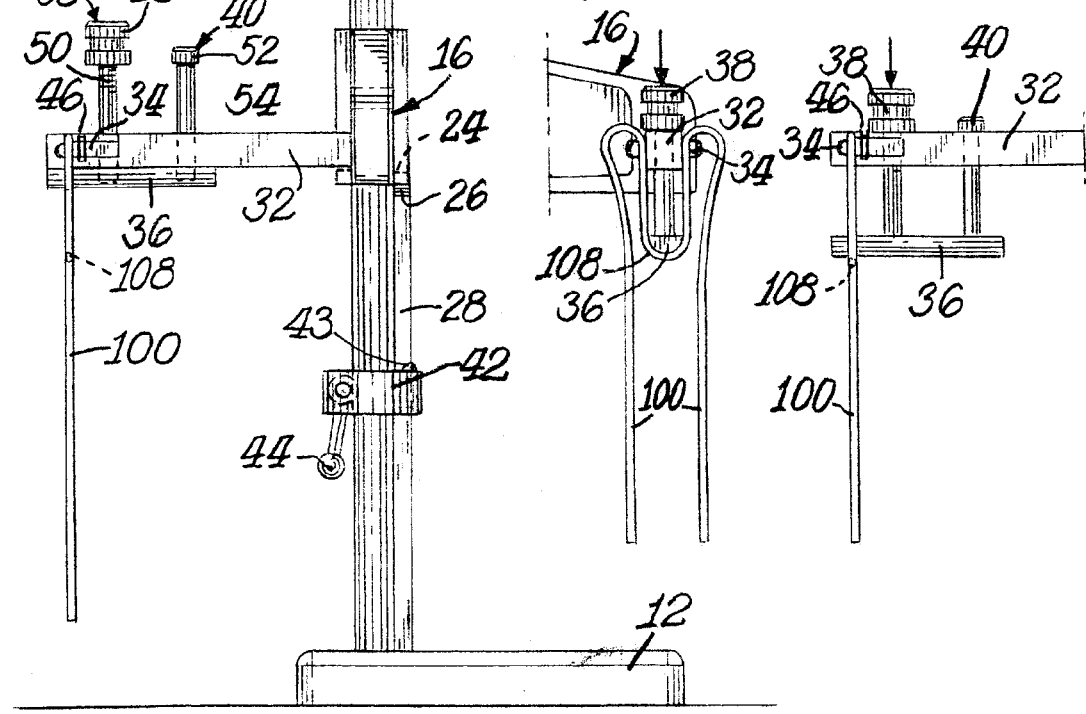

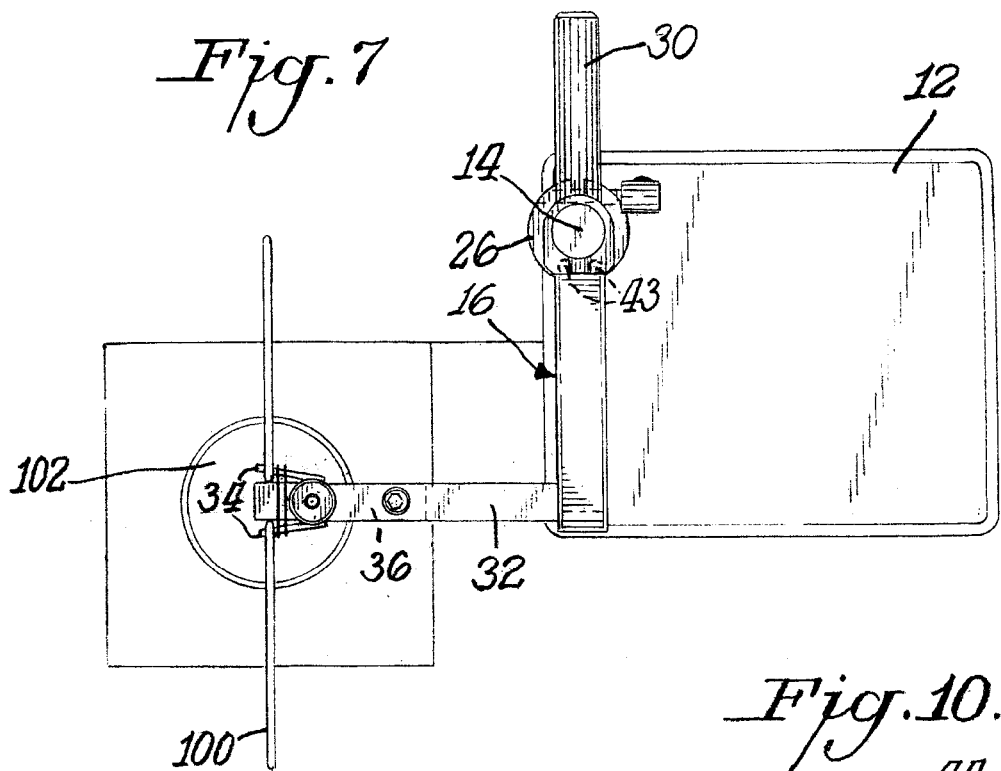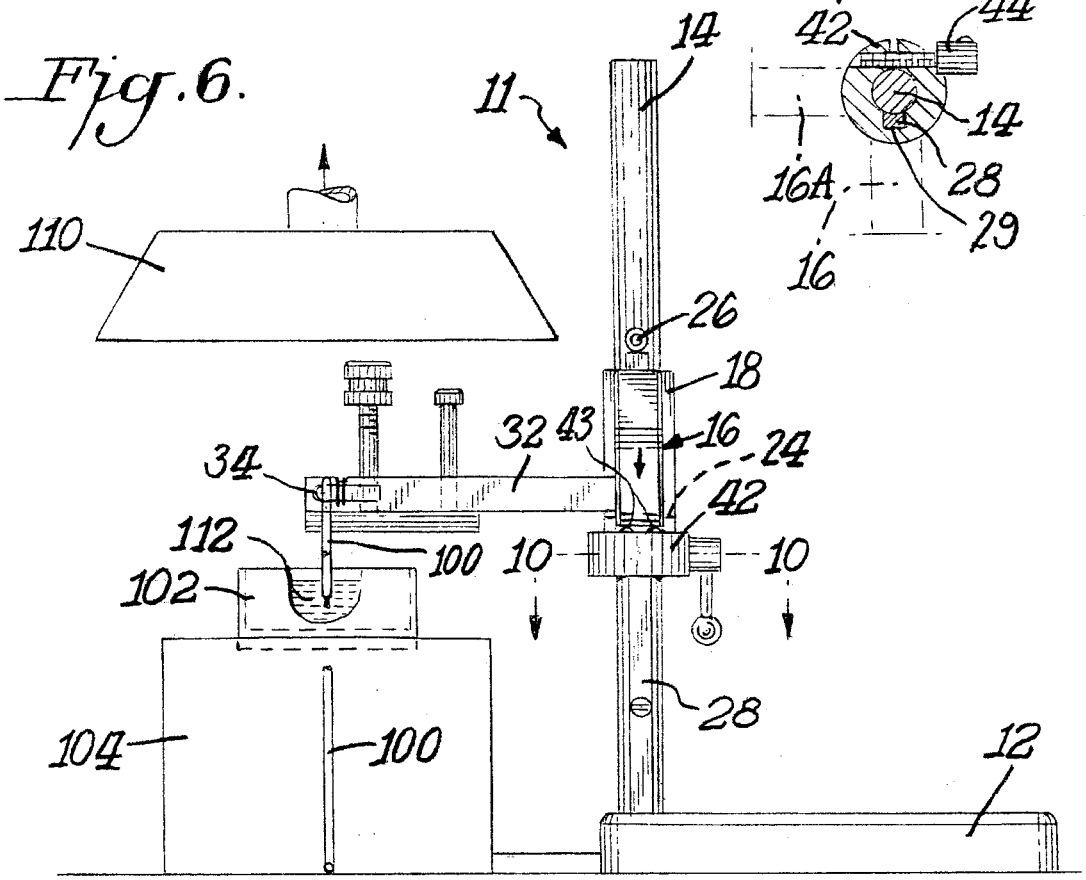

SYSTEM FOR REMOVING A UNIFORM LENGTH OF COATING FROM A FIBER OPTIC CABLE

BACKGROUND OF THE INVENTION

A. Field of the Invention

The present invention relates generally to the communications field, and, more particularly to a system for removing a uniform length of a coating from a fiber optic cable.

B. Description of the Related Art

Along with the increasing prominence of the Internet has come the wide-ranging demand for increased communications capabilities, including more channels and greater bandwidth per channel. Optical media, such as fiber optic cables, promise an economical alternative to electrical conductors for high-bandwidth long-distance communications. A typical fiber optic cable includes a silica core (glass optical fiber), a silica cladding, and a protective coating. The glass optical fiber of fiber optic cables has a very small diameter, which is susceptible to external influences such as mechanical stress and environmental conditions. The index of refraction of the core is higher than the index of refraction of the cladding to promote internal reflection of light propagating down the core.

Certain uses of fiber optic cables require that a portion of the coating be removed from an end of the fiber optic cable or a portion of the fiber optic cable that is remote from the ends. For example, to make a fiber optic coupler, the coating is stripped from portions of at least two fiber optic cables, and the stripped portions are fused together in side-by-side relationship and stretched. It is important that the stripped portions of the fiber optic cables do not become weakened during the stripping process since weakened fiber optic cables can fail during subsequent process steps or during handling of the coupler when tensile stress is applied to the exposed glass optical fiber.

Other uses of fiber optic cables require that a portion of the coating, remote from the ends of the fiber optic cable, be removed. For example, when an optical fiber diffraction grating is provided in a fiber optic cable, a portion of the coating, remote from the ends of the cable, is removed. Ideally, the portion of the coating that is removed for provision of the diffraction grating should be consistent for all fiber optic cables, so that the removed portions of fiber optic cables may be properly recoated after the diffraction grating is etched.

While there are many methods for establishing a diffraction grating within a fiber, one method involves exposing photosensitive glass optical fiber to patterned light, via lasers. The lasers are used to etch lines in the glass optical fiber that is exposed (i.e., the coating removed) at the portion of the fiber optic cable remote from the ends of the fiber optic cable.

A coating of a fiber optic cable may be removed or stripped in a variety of ways. Coatings can be mechanically stripped from an optical fiber by placing the fiber within a hand-held tool, bringing blades of the tool into contact with opposite sides of the coating layer, and then moving the tool relative to the axis of the coated optical fiber. The bare portion of the fiber usually needs to be wiped with a cloth wetted with alcohol or the like to remove smudges and/or particles of coating that have been deposited on the bare portion of optical fiber by the coating removal process. This type of coating removal process has been built into equipment that performs the tasks of the technician, whereby the process is no longer manual.

These processes have various disadvantages. Processes that are adapted to remove coating only from the end of a coated fiber are often not useful for removing coating from regions remote from the fiber ends, a requirement for making diffraction gratings. Mechanical strippers can cause scoring or scratching of the fiber surface. For example, the fiber surface can be scratched as the bare glass fiber without its coating is removed from the mechanical stripping device. Some stripping methods do not result in a clean demarcation between the stripped coating and the coating remaining on the fiber. If the stripping process results in a ragged or uneven coating termination, the resultant stripped fiber may not be useful for its intended purpose. The wiping step to remove contaminants from a stripped fiber can cause more damage to the fiber than the mechanical stripping step. Finally, mechanical stripping that is manually performed is highly operator dependent as it is typically performed with a hand held stripper.

Coatings may also be chemically removed by contacting the coated fiber with materials such as sulfuric acid and hydrogen peroxide (to remove a polyester coating) or with sulfuric acid (to dissolve a polysyloxine coating). The primary chemical method for removing an optical fiber's polymer coating with minimal degradation in tensile strength is acid stripping using a hot sulfuric nitric mixture, that is, 95% sulfuric acid and 5% nitric acid. Specifically, this method involves heating the sulfuric nitric mixture to approximately 185° C., immersing the optical fiber in the hot sulfuric nitric mixture for approximately 20 seconds, and rinsing the optical fiber for two to ten seconds in a rinser, such as acetone, alcohol, methanol, purified water, or a combination of these.

Although tensile strength degradation is minimized, chemical stripping processes can be disadvantageous in that they are difficult to control, and may leave contaminants or residual coating on the fiber surface. Chemical stripping can also be disadvantageous in that it utilizes dangerous caustic chemicals that need to be safely handled and disposed of. Thus, safety concerns are often present with acid stripping methods. Field technicians employing acid stripping methods require well-ventilated areas, such as laboratory environments with exhaust hoods, and protective gear to safeguard themselves from fumes and burns associated with acids.

Furthermore, with current chemical and mechanical stripping systems, it is extremely difficult, if not impossible, to strip a consistent portion of the fiber optic cable coating. As discussed above, such consistently stripped portions are necessary if the stripped portions are to be properly recoated.

Thus, there is a need in the art to provide an apparatus for removing a consistent portion of a coating from a fiber optic cable in a safe manner, while minimizing the tensile strength degradation of the exposed glass optical fiber of the fiber optic cable.

SUMMARY OF THE INVENTION

The present invention solves the problems of the related art by providing a system and method for removing a predetermined length of coating from a fiber optic cable in a safe manner, while minimizing the tensile strength degradation of the exposed glass optical fiber of the cable.

In accordance with the purpose of the invention, as embodied and broadly described herein, the invention comprises an apparatus for holding a fiber optic cable to be stripped, including: a mount having means for retaining portions of the fiber optic cable; a push rod movably extending through said mount; and a fiber optic cable loop former connected to said push rod, wherein said fiber optic cable loop former is pushed away from said mount by said push rod and engages the fiber optic cable to form a loop therein.

Further in accordance with the purpose of the invention, as embodied and broadly described herein, the invention comprises a system for removing a predetermined length of coating from a fiber optic cable, including: a chemical bath; and an apparatus for holding a fiber optic cable to be stripped, having: a vertical column, a slide arm having a guide collar portion slidably provided on the vertical column, and a distal portion extending away from and integral with the guide collar portion, a mount extending from and connected to the distal portion of the slide arm, the mount having means for retaining portions of the fiber optic cable, a push rod movably extending through the mount, a fiber optic cable loop former connected to the push rod, wherein the fiber optic cable loop former is pushed away from the mount by the push rod and engages the fiber optic cable to form a loop therein; wherein the slide arm is lowered on the vertical column a predetermined height so that the loop formed in the fiber optic cable is provided in said chemical bath to remove a predetermined length of coating from the fiber optic cable.

Still further in accordance with the purpose of the invention, as embodied and broadly described herein, the invention comprises a method for forming a loop in a fiber optic cable so that a predetermined length of coating of the fiber optic cable may be removed in an apparatus having a mount with means for retaining portions of the fiber optic cable, a push rod movably extending through the mount, and a fiber optic cable loop former connected to the push rod, including: forcing the push rod downward to move the fiber optic cable loop former downward; retaining portions of the fiber optic cable against the mount and the fiber optic cable loop former with the retaining means of the mount to form a loop in the fiber optic cable; forcing the push rod upward, while the loop formed in the fiber optic cable is maintained.

Still even further in accordance with the purpose of the invention, as embodied and broadly described herein, the invention comprises a method for removing a predetermined length of coating from a fiber optic cable in a system having a chemical bath and a system for forming a loop in a fiber optic cable, the loop forming system having a vertical column, a slide arm having a guide collar portion slidably provided on the vertical column, and a distal portion extending away from and integral with the guide collar portion, a mount extending from and connected to the distal portion of the slide arm, the mount having means for retaining portions of the fiber optic cable, a push rod movably extending through the mount, and a fiber optic cable loop former connected to the push rod, including: forcing the push rod downward to move the fiber optic cable loop former downward; retaining portions of the fiber optic cable against the mount and the fiber optic cable loop former with the retaining means of the mount to form a loop in the fiber optic cable; forcing the push rod upward, while the loop formed in the fiber optic cable is maintained; rotating the slide arm so that the fiber optic cable loop former is rotated toward the chemical bath; and lowering the slide arm on the vertical column a predetermined height so that the loop formed in the fiber optic cable is provided in the chemical bath to remove a predetermined length of coating from the fiber optic cable.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is side elevational view of a system for removing a uniform length of a coating from a fiber optic cable in accordance with an embodiment of the present invention and showing the system in a load position;

FIG. 2 is a top plan view of the system shown in FIG. 1;

FIG. 3 is a front elevational view of the system shown in FIG. 1;

FIG. 4 is a fragmental front elevational view of the system shown in FIG. 1, and showing the fiber optic cable being extended into a loop for dipping into a chemical bath;

FIG. 5 is fragmental side elevational view of the system shown in FIG. 4;

FIG. 6 is a side elevational view of the system shown in FIG. 1, and showing the fiber optic cable as it enters into the stripper chemical;

FIG. 7 is a top plan view of the system shown in FIG. 6;

FIG. 8 is an enlarged fragmental front elevational view of the system shown in FIG. 6;

FIG. 9 is a side elevational view showing how a fiber optic cable is stripped using system of the present invention; and FIG. 10 is a cross-sectional plan view showing a stop collar that controls the height of a slide arm of the system of the present invention, taken along line 10—10 of FIG. 6.

DETAILED DESCRIPTION OF THE PREFERRED EMBODIMENTS

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Referring now specifically to the drawings, a system for removing a uniform length of a coating from a fiber optic cable according to the present invention is illustrated in FIGS. 1 and 2, and shown generally as reference numeral 11. FIGS. 1 and 2 show system 11 in a raised position, during the loading of a fiber optic cable 100 into system 11, and before fiber optic cable 100 is dipped into a chemical bath 102 provided on a heating plate 104 for removal of the coating of fiber optic cable 100. System 11 includes a base 12 connecting to and supporting a vertical column 14. A stop roller 26 and a key 28 are provided on a portion of vertical column 14.

A slide arm 16 is moveably provided on vertical column 14, via a guide collar portion 18 thereof. Slide arm 16 may move towards and away from base 12, by moving guide collar portion 18 along vertical column 14. Slide arm 16 further includes an intermediate portion 20 integrally connected to guide collar portion 18, and a distal portion 22 integrally connected to intermediate portion 20. A half round detent 24 is provided at the bottom of guide collar portion 18. Half round detent 24 engages stop roller 26 provided at the top of key 28 of vertical column 14 to prevent rotation of slide arm 16 on vertical column 14. Stop roller 26 and key 28 extend away from and are integral with vertical column 14. An actuator handle 30 extends from and connects to guide collar portion 18 of slide arm 16.

A fiber optic mount shaft 32 extends from and connects to distal portion 22 of slide arm 16 at one end thereof. A pair of clamps 34 and a fiber optic cable loop former 36 are provided at the other end of mount shaft 32. Loop former 36 preferably has a semicircular cross-section, although other cross-sections may be utilized depending upon the application of fiber optic cable 100.

As shown in FIG. 2, a tension spring 46 wraps around and biases clamps 34 so that clamps 34 retain portions of fiber optic cable 100 against loop former 36 and mount shaft 32, as will be described more fully below. A height adjustment push rod 38 and a guide rod 40, spaced from height adjustment push rod 38, extend through mount shaft 32 and connect to loop former 36.

An adjustable stop collar 42 is also provided on vertical column 14, below slide arm 16. Adjustable stop collar 42 may be fixedly attached to vertical column 14, at a predetermined height, by tightening a locking handle 44 connected to adjustable stop collar 42, as best shown in FIG. 10. FIG. 10 shows a cross-sectional view of stop collar 42 affixed to vertical column 14 by tightened locking handle 44. Also shown is key 28 engaged with a key way 29 disposed in collar 42 to prevent rotation of collar 42 during vertical height adjustment along column 14. Slide arm 16 is shown schematically in phantom outline in a load position of cable 100 (reference numeral 16), and in a chemical immersion position of cable 100 (reference numeral 16A).

When locking handle 44 is rotated in one direction, stop collar 42 compresses around vertical column 14, fixing stop collar 42 to vertical column 14. When locking handle 44 is rotated in the opposite direction, stop collar 42 disengages vertical column 14 and may be moved along vertical column 14. Stop collar 42 further includes spring plungers 43 extending into and partially away from its top portion. As will be more fully described below, adjustable stop collar 42 is set at a predetermined height so that a predetermined length of fiber optic cable 100 is dipped into chemical bath 102.

As shown in FIG. 3, height adjustment push rod 38 includes a knob portion 48 adjustably provided on a threaded rod portion 50. Threaded rod portion 50 extends through mount shaft 32 and connects to loop former 36. Knob portion 48 may be rotated downward on threaded rod portion 50 to shorten the distance knob portion 48 is positioned above mount shaft 32. This enables a technician using system 11 to alter the size of the loop formed by loop former 36, as described below with reference to FIGS. 4 and 5. Guide rod 40 also includes a knob portion 52 integrally attached to a rod portion 54. Rod portion 54 also extends through mount shaft 32 and connects to loop former 36. The spacing between height adjustment push rod 38 and guide rod 40 prevents loop former 36 from rotating about the axis of either rod 38, 40.

The height adjustment push rod 38 may also be constructed as a simple push rod (similar to guide rod 40) having no height adjustment feature by eliminating the knob portion 48 and screw threads on the push rod 38. While this is not the preferred construction because it does not allow fine tuning of the loop size, it is a possible alternative construction.

FIGS. 4 and 5 show how a loop 108 is formed in fiber optic cable 100. First, a technician applies a downward force to push rod 38 or guide rod 40, forcing loop former 36 away from mount shaft 32 until knob portion 48 of push rod 38, and possibly knob portion 52 of guide rod 40 (depending upon the height of knob portion 48) engages mount shaft 32. While holding push rod 38 or guide 40 down, the technician then attaches one portion of fiber optic cable 100 in one clamp 34, loops cable 100 around the surface of loop former 36, and attaches another portion of fiber optic cable 100 to the other clamp 34 (while maintaining cable 100 against loop former 36 surface). Tensioning spring 46 forces portions of fiber optic cable 100 between clamps 34 and mount shaft 32. The force applied by tensioning spring 46 is sufficient to hold fiber optic cable 100 against mount shaft 32, without damaging cable 100. A loop 108 having a predetermined sized is thus formed in fiber optic cable 100. The technician then pulls loop former 36 upward until it engages mount shaft 32, as shown in FIG. 3.

If knob portion 48 of height adjustment push rod 38 is adjusted downward towards mount shaft 32, then the predetermined size of loop 108 formed in fiber optic cable 100 is reduced. In contrast, if knob portion 48 of height adjustment push rod 38 is adjusted upward away from mount shaft 32, then the predetermined size of the loop 108 formed in fiber optic cable 100 is increased. A technician may wish to alter the predetermined size of the loop 108 formed in fiber optic cable 100 to compensate for evaporation or utilization of the chemical contained in chemical bath 102.

Fiber optic cable loop former 36 may include therein or comprise a metallic material or a magnetic material that generates a magnetic force sufficient to hold loop former 36 against mount shaft 32. Mount shaft 32 may also be made of a metallic material, contain a magnetic material (if loop former 36 is metallic), or contain a magnetic material having the opposite polarity of the magnetic material contained in or making up loop former 36.

With system 11 in a load position as shown in FIGS. 1 and 2, the technician loads fiber optic cable 100 onto loop former 36 to form loop 108 in cable 100, as described above with reference to FIGS. 3–5. The load position of system 11 is away from chemical bath 102 so that the technician is not exposed to chemical fumes. Chemical bath 102 is preferably located under a fume hood 110, as shown in FIG. 6.

After loop 108 is formed in fiber optic cable 100, the technician may then orient system 11 into a chemical strip position as shown in FIGS. 6 and 7. To place system 11 in this position, the technician first rotates slide arm 16 by pulling actuator handle 30 slightly upward to disengage half round detent 24 from stop roller 26. Guide collar portion 18 of slide arm 16 is then rotated until it aligns with key 28. Key 28 is located below stop roller 26, so that slide arm 16 is rotated ninety degrees from its loading position shown in FIGS. 1 and 2. Slide arm 16 may then slide down vertical column 14 until guide collar portion 18 engages stop collar 42. FIG. 6 shows how system 11 is arranged within a fume hood 110 in the chemical strip position. System 11 enables the technician to load and unload fiber optic cable 100 outside fume hood 110, preventing exposure to the harmful chemical fumes emanating from chemical bath 102. Fume hood 110 may be any conventional type of fume hood.

FIG. 8 is an enlarged fragmental front elevational view showing a chemically-stripped fiber optic cable 100 as it is immersed in chemical bath 102. As shown in FIG. 8, it is preferred that the entire curved portion of loop 108 of cable 100 is immersed in the chemical 112 of chemical bath 102. Chemical 112 strips a portion of the coating of cable 100, exposing a glass optical fiber 114 in a portion of cable 100. Chemical bath 102 may be any conventional chemical bath used to strip coatings from fiber optic cables, e.g., a hot sulfuric nitric mixture chemical bath.

FIG. 9 shows a side elevational view of a chemically-stripped fiber optic cable 100. Fiber optic cable 100 may have any length B. Typically length B ranges from one to two meters, although the present invention may work with a cable 100 having a length large enough to be provided in fiber loop former 36. The exposed glass optical fiber 114 of cable 100 has a consistent (uniform) length A. Such a consistently-stripped portion is preferred if diffraction gratings are to be provided within fiber optic cable 100. Length A may vary depending upon the application of cable 100. Preferably, however, length A ranges from two to four centimeters.

As further shown in FIG. 9, the stripped coating portion of fiber optic cable 100 has a taper. The taper may be provided by briefly pushing down on guide collar portion 18 so that guide collar portion 18 forces spring plunger 43 into stop collar 42. This enables fiber optic cable 100 to be briefly immersed deeper into the chemical 112 of chemical bath 102 thereby forming the tapered portions in the coating of cable 100. Preferably, fiber optic cable 100 is immersed an additional 1/16 of an inch into the chemical 112 for a few seconds. The tapered portions of the cable coating further enhances the recoating of cable 100 since the recoating material adheres more readily to the tapered portions.

The amount of loop 108 provided in chemical bath 102 may be fine tuned by the technician by adjusting knob portion 48 of height adjustment push rod 38, although height adjustment push rod 38 is optional. Alternatively or concurrently, the height of stop collar 42 may be adjusted by the technician so that a consistent portion of loop 108 formed in fiber optic cable 100 is provided in the chemical 112 of chemical bath 102.

It will be apparent to those skilled in the art that various modifications and variations can be made in the system for removing a uniform length of a coating from a fiber optic cable of the present invention and in construction of this system without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for holding a fiber optic cable to be stripped, comprising:
    a mount having means for retaining portions of the fiber optic cable;
    a push rod movably extending through said mount; and
    a fiber optic cable loop former connected to said push rod, wherein said fiber optic cable loop former is pushed away from said mount by said push rod and engages the fiber optic cable to form a loop therein.

2. An apparatus for holding a fiber optic cable to be stripped as recited in claim 1, wherein said fiber optic cable loop former comprises a magnetic material that forces said fiber optic cable loop former against the surface of said mount until pushed away therefrom by said push rod during formation of the loop in the fiber optic cable.

3. An apparatus for holding a fiber optic cable to be stripped as recited in claim 1, wherein said push rod comprises a height adjusting push rod.

4. An apparatus for holding a fiber optic cable to be stripped as recited in claim 3, wherein said height adjusting push rod comprises a knob portion adjustably provided on a threaded rod portion, the threaded rod portion extending through said mount and connecting to said fiber optic cable loop former, wherein the knob portion is adjustable on the threaded rod portion to vary the distance the knob portion is positioned above said mount shaft, which varies the size of the loop formed in the fiber optic cable.

5. An apparatus for holding a fiber optic cable to be stripped as recited in claim 1, further comprising:
    a vertical column; and
    a slide arm having a guide collar portion slidably provided on said vertical column, and a distal portion extending away from and integral with the guide collar portion.

6. An apparatus for holding a fiber optic cable to be stripped as recited in claim 5, wherein said vertical column includes a stop roller, and said slide arm includes a detent that engages the stop roller of said vertical column to prevent rotation of said slide arm.

7. An apparatus for holding a fiber optic cable to be stripped as recited in claim 5, wherein said vertical column includes a key extending away from a surface thereof, and the guide collar portion of said slide arm engages the key of said vertical column to prevent rotation of said slide arm.

8. An apparatus for holding a fiber optic cable to be stripped as recited in claim 7, wherein said slide arm is lowered on said vertical column a predetermined height when the guide collar portion of said slide arm engages the key of said vertical column.

9. An apparatus for holding a fiber optic cable to be stripped as recited in claim 8, further comprising an adjustable stop collar provided on said vertical column below said slide arm, wherein said adjustable collar sets the predetermined height of said slide arm and has at least one spring plunger provided therein, the at least one spring plunger contacting said slide arm to permit said slide arm to be provided below the predetermined height.

10. An apparatus for holding a fiber optic cable to be stripped as recited in claim 1, wherein means for retaining portions of the fiber optic cable comprises a plurality of clamps biased against said mount by a tensioning spring.

11. A system for removing a predetermined length of coating from a fiber optic cable, comprising:
    a chemical bath; and
    an apparatus for holding a fiber optic cable to be stripped, having:
        a vertical column,
        a slide arm having a guide collar portion slidably provided on the vertical column, and a distal portion extending away from and integral with the guide collar portion,
        a mount extending from and connected to the distal portion of the slide arm, the mount having means for retaining portions of the fiber optic cable,
        a push rod movably extending through the mount,
        a fiber optic cable loop former connected to the push rod, wherein the fiber optic cable loop former is pushed away from the mount by the push rod and engages the fiber optic cable to form a loop therein;

wherein the slide arm is lowered on the vertical column a predetermined height so that the loop formed in the fiber optic cable is provided in said chemical bath to remove a predetermined length of coating from the fiber optic cable.

12. A system for removing a predetermined length of coating from a fiber optic cable as recited in claim 11, said apparatus for holding a fiber optic cable further including an adjustable stop collar provided on the vertical column below the slide arm, wherein the adjustable collar sets the predetermined height of the slide arm and has at least one spring plunger provided therein, the at least one spring plunger contacting the slide arm to permit the slide arm to be provided below the predetermined height.

13. A system for removing a predetermined length of coating from a fiber optic cable as recited in claim 11, wherein the vertical column includes a stop roller, and the slide arm includes a detent that engages the stop roller of the vertical column to prevent rotation of the slide arm.

14. A system for removing a predetermined length of coating from a fiber optic cable as recited in claim 11, wherein the vertical column includes a key extending away from a surface thereof, and the guide collar portion of the slide arm engages the key of the vertical column to prevent rotation of the slide arm.

15. A system for removing a predetermined length of coating from a fiber optic cable as recited in claim 14, wherein the fiber optic cable loop former is rotated toward said chemical bath when the guide collar portion of the slide arm engages the key of the vertical column.

16. A system for removing a predetermined length of coating from a fiber optic cable as recited in claim 11, wherein means for retaining portions of the fiber optic cable comprises a plurality of clamps biased against the mount by a tensioning spring.

17. A system for removing a predetermined length of coating from a fiber optic cable as recited in claim 11, wherein a stop collar attached to the vertical column sets the predetermined height of the slide arm and has at least one spring plunger that lowers the slide arm below the predetermined height to form tapers in the removed coating of the fiber optic cable.

18. A system for removing a predetermined length of coating from a fiber optic cable as recited in claim 11, wherein the push rod comprises a knob portion adjustably provided on a threaded rod portion, the threaded rod portion extending through the mount and connecting to the fiber optic cable loop former, wherein the knob portion is adjustable on the threaded rod portion to vary the distance the knob portion is positioned above the mount, which varies the size of the loop formed in the fiber optic cable.

19. A system for removing a predetermined length of coating from a fiber optic cable as recited in claim 11, wherein the fiber optic cable loop former comprises a magnetic material that forces the fiber optic cable loop former against the surface of the mount until pushed away therefrom by the push rod during formation of the loop in the fiber optic cable.

20. A method for forming a loop in a fiber optic cable so that a predetermined length of coating of the fiber optic cable may be removed in an apparatus having a mount with means for retaining portions of the fiber optic cable, a push rod movably extending through the mount, and a fiber optic cable loop former connected to the push rod, comprising:

moving the push rod downward to move the fiber optic cable loop former downward; and retaining portions of the fiber optic cable against the mount and the fiber optic cable loop former with the retaining means of the mount to form a loop in the fiber optic cable.

21. A method for forming a loop in a fiber optic cable as recited in claim 20, further comprising:

moving the push rod upward, while the loop formed in the fiber optic cable is maintained.

22. A method for removing a predetermined length of coating from a fiber optic cable in a system having a chemical bath and a system for forming a loop in a fiber optic cable, the loop forming system having a vertical column, a slide arm having a guide collar portion slidably provided on the vertical column, and a distal portion extending away from and integral with the guide collar portion, a mount extending from and connected to the distal portion of the slide arm, the mount having means for retaining portions of the fiber optic cable, a push rod movably extending through the mount, and a fiber optic cable loop former connected to the push rod, comprising:

moving the push rod downward to move the fiber optic cable loop former downward;

retaining portions of the fiber optic cable against the mount and the fiber optic cable loop former with the retaining means of the mount to form a loop in the fiber optic cable;

moving the push rod upward, while the loop formed in the fiber optic cable is maintained;

rotating the slide arm so that the fiber optic cable loop former is rotated toward the chemical bath; and lowering the slide arm on the vertical column a predetermined height so that the loop formed in the fiber optic cable is provided in the chemical bath to remove a predetermined length of coating from the fiber optic cable.

23. A method for removing a predetermined length of coating from a fiber optic cable as recited in claim 22, further comprising:

lowering the slide arm below the predetermined height to form tapers in the removed coating of the fiber optic cable.

* * * * *